(12) United States Patent
Jeon et al.

(10) Patent No.: US 11,377,360 B2
(45) Date of Patent: Jul. 5, 2022

(54) METHOD OF PREPARING ACICULAR METAL-SILICA COMPOSITE AEROGEL PARTICLES AND ACICULAR METAL-SILICA COMPOSITE AEROGEL PARTICLES PREPARED THEREBY

(71) Applicant: LG CHEM, LTD., Seoul (KR)

(72) Inventors: Hyun Woo Jeon, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 590 days.

(21) Appl. No.: 16/334,688

(22) PCT Filed: Nov. 1, 2017

(86) PCT No.: PCT/KR2017/012280
§ 371 (c)(1),
(2) Date: Mar. 19, 2019

(87) PCT Pub. No.: WO2018/186546
PCT Pub. Date: Oct. 11, 2018

(65) Prior Publication Data
US 2021/0292176 A1 Sep. 23, 2021

(30) Foreign Application Priority Data
Apr. 7, 2017 (KR) ........................ 10-2017-0045424

(51) Int. Cl.
*C01B 33/158* (2006.01)
*B01J 13/00* (2006.01)
*C01B 33/154* (2006.01)

(52) U.S. Cl.
CPC ....... *C01B 33/1585* (2013.01); *B01J 13/0091* (2013.01); *C01B 33/154* (2013.01); *C01P 2002/08* (2013.01); *C01P 2004/54* (2013.01)

(58) Field of Classification Search
None
See application file for complete search history.

(56) References Cited

U.S. PATENT DOCUMENTS 3,313,635 A    4/1967  Wollek et al.
5,306,555 A    4/1994  Ramamurthi et al.
(Continued)

FOREIGN PATENT DOCUMENTS

CN    101691227 A    4/2010
CN    103333542 A    10/2013
(Continued)

OTHER PUBLICATIONS

Casas et al., "Silica aerogel-iron oxide nanocomposites: structural and magnetic properties," Journal of Non-Crystalline Solids 285:37-43 (2001).
(Continued)

*Primary Examiner* — Anthony J Zimmer
(74) *Attorney, Agent, or Firm* — Morgan, Lewis & Bockius LLP

(57) ABSTRACT

A method of preparing acicular metal-silica composite aerogel particles by adjusting an aspect ratio of the acicular shape through the adjustment of concentrations of an acidic solution, a solution including a metal salt, and a water glass solution which are reactants, and acicular metal-silica composite aerogel particles prepared thereby. The method prepares acicular metal-silica composite aerogel particles in a short period of time under mild conditions of low temperature and atmospheric pressure, the process is simple, and production costs are reduced in comparison to a conventional preparation method, and thus, productivity and economic efficiency are excellent. When the acicular metal-
(Continued)

silica composite aerogel particles are used as an additive of a polymer resin, physical properties, such as viscosity and thixotropy, are improved.

16 Claims, 7 Drawing Sheets

(56) References Cited

U.S. PATENT DOCUMENTS

2015/0141532 A1 5/2015 Kim et al.
2018/0127279 A1 5/2018 Kim et al.
2018/0208474 A1* 7/2018 Kim .................. B01J 31/02

FOREIGN PATENT DOCUMENTS

| CN | 104925819 A | 9/2015 | | |
|---|---|---|---|---|
| CN | 106431168 | 2/2017 | | |
| KR | 10-2010-0065692 | 6/2010 | | |
| KR | 10-2012-0070948 | 7/2012 | | |
| KR | 10-2013-0048739 | 5/2013 | | |
| KR | 10-1433851 | 8/2014 | | |
| KR | 10-1467836 | 12/2014 | | |
| KR | 10-2016-0136563 | 11/2016 | | |
| KR | 20160141670 | 12/2016 | | |
| WO | 2015192731 | 12/2015 | | |
| WO | WO-2017099488 A1 * | 6/2017 | ........... | C01B 33/158 |

OTHER PUBLICATIONS

Villacampa et al., "Synthesis of a new hydroxyapatite-silica composite material," Journal of Crystal Growth 211:111-115 (2000).
Song et al., "Preparation of calcium sulfate whiskers using waste calcium chloride by reactive crystallization," Crystal Research Technology 46(2): 166-172 (2011).

* cited by examiner

METHOD OF PREPARING ACICULAR METAL-SILICA COMPOSITE AEROGEL PARTICLES AND ACICULAR METAL-SILICA COMPOSITE AEROGEL PARTICLES PREPARED THEREBY

CROSS-REFERENCE TO RELATED APPLICATIONS

This application is a National Stage Application of International Application No. PCT/KR2017/012280 filed on Nov. 1, 2017, which claims the benefit of Korean Patent Application No. 10-2017-0045424, filed on Apr. 7, 2017, in the Korean Intellectual Property Office, the disclosure of which is incorporated herein in its entirety by reference.

TECHNICAL FIELD

The present invention relates to a method of preparing acicular metal-silica composite aerogel particles, and metal-silica composite aerogel particles prepared thereby.

BACKGROUND ART

Since an aerogel, as a high specific area (≥500 m²/g), ultra-porous material having a porosity of about 90% to about 99.9% and a pore diameter of about 1 nm to about 100 nm, has excellent characteristics such as ultra lightweightness, ultra insulation, and ultra-low dielectric constant, research into the applications of the aerogel in various fields such as an insulator, an ultra-low dielectric thin film for a highly integrated device, an electrode for a supercapacitor, an electrode material for desalination, a catalyst and a catalyst support, a reinforcement, a filter, and a coating material as well as the development of an aerogel material has been actively conducted.

Particularly, among these applications, a metal-silica composite aerogel, in which metal is introduced into an aerogel, is being used as an additive of a polymer resin.

However, the metal-silica composite aerogel is advantageous in processing because it has a network structure and its shape is close to spherical, but it is difficult to expect high viscosity effect and thixotropy due to morphological problems.

In a case in which the metal-silica composite aerogel is used as the additive of a polymer resin, viscosity and thixotropy may be considered as very important physical properties when the additive is subsequently used in a product, for example, if the additive having thixotropy is used in a paint, it is advantageous to apply the paint because viscosity is reduced when a force is applied, and no flow occurs because the viscosity is increased when the force is removed.

Thus, in order to address the above limitations, there have been attempts to develop a method of preparing acicular, i.e., a shape favorable for viscosity and thixotropy, metal-silica composite aerogel particles.

However, with respect to conventional acicular metal-silica composite aerogel particles or other acicular additives, the use of separate high-temperature and high-pressure equipment, such as an autoclave, is essential, and, in a case in which synthesis is performed at a temperature of 100° C. or less under an atmospheric pressure condition, since a long reaction time of 24 hours to 72 hours is required, the process may be complicated and productivity and economic efficiency may be reduced.

Thus, in the preparation of metal-silica composite aerogel particles used as an additive for a polymer resin, the inventors of the present invention have developed a novel method of preparing acicular metal-silica composite aerogel particles which may maximize morphological advantages of an acicular shape and may prepare acicular metal-silica composite aerogel particles in a short period of time under mild reaction conditions of low temperature and atmospheric pressure.

PRIOR ART DOCUMENTS (Patent Document 1) Korean Patent Application Laid-open Publication No. 10-2010-0065692 (2010 Jun. 17)

DISCLOSURE OF THE INVENTION

Technical Problem

An aspect of the present invention provides a method of preparing acicular metal-silica composite aerogel particles which may improve physical properties, such as viscosity and thixotropy, when the acicular metal-silica composite aerogel particles are used as an additive of a polymer resin, by adjusting an aspect ratio of the acicular shape through the adjustment of concentrations of an acidic solution, a solution including a metal salt, and a water glass solution which are reactants.

Another aspect of the present invention provides a method of preparing acicular metal-silica composite aerogel particles which may prepare acicular metal-silica composite aerogel particles in a short period of time under mild conditions of low temperature and atmospheric pressure.

Another aspect of the present invention provides acicular metal-silica composite aerogel particles prepared by the above preparation method.

Technical Solution

According to an aspect of the present invention, there is provided a method of preparing acicular metal-silica composite aerogel particles which includes steps of:

(1) adding a water glass solution to an acidic solution in a reactor;

(2) forming an acicular intermediate by adding a solution including a metal salt after the addition of the water glass solution; and (3) adding a basic catalyst to the reactor including the acicular intermediate to perform a gelation reaction, wherein concentrations of the acidic solution and the solution including a metal salt are in a range of 1.0 M to 3.0 M, and a concentration of the water glass solution is in a range of 0.33 M to 1.0 M.

According to another aspect of the present invention, there is provided acicular metal-silica composite aerogel particles prepared by the method of the present invention, wherein an aspect ratio is in a range of 1:20 to 1:25, and a thixotropic index is in a range of 5 to 7.

According to another aspect of the present invention, there is provided an additive for a polymer resin which includes the acicular metal-silica composite aerogel particles of the present invention.

Advantageous Effects

A method of preparing acicular metal-silica composite aerogel particles according to the present invention may maximize morphological advantages of an acicular shape by adjusting an aspect ratio of the acicular shape through the adjustment of concentrations of an acidic solution, a solution including a metal salt, and a water glass solution which are reactants.

Also, in a case in which the preparation method of the present invention is used, since acicular metal-silica composite aerogel particles may be prepared in a short period of time at low temperature and atmospheric pressure, the process is simple and production costs are reduced in comparison to a conventional preparation method, and thus, productivity and economic efficiency are excellent.

Furthermore, since the acicular metal-silica composite aerogel particles prepared by the preparation method of the present invention have high viscosity, low density, and high chemical, thermal, and dimensional stability when used as an additive of a polymer resin, physical properties of the polymer resin may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 1:
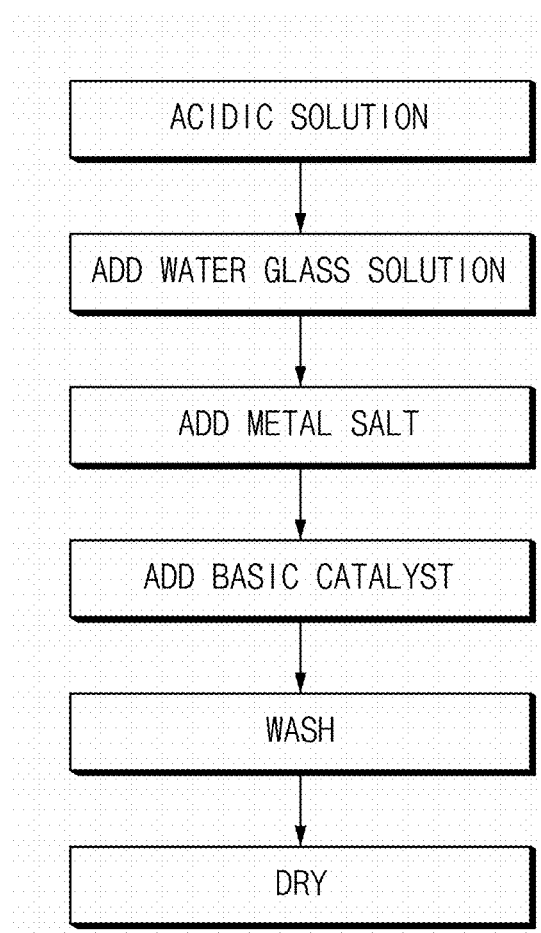
FIG. 1 is a flowchart schematically illustrating a method of preparing acicular metal-silica composite aerogel particles according to an embodiment of the present invention.

As illustrated in a flowchart of FIG. 1, a method of preparing acicular metal-silica composite aerogel particles according to an embodiment of the present invention includes the steps of:

1) adding a water glass solution to an acidic solution in a reactor;

2) forming an acicular intermediate by adding a solution including a metal salt after the addition of the water glass solution; and 3) adding a basic catalyst to the reactor including the acicular intermediate to perform a gelation reaction, wherein concentrations of the acidic solution and the solution including a metal salt are in a range of 1.0 M to 3.0 M, and a concentration of the water glass solution is in a range of 0.33 M to 1.0 M.

Hereinafter, the method of preparing acicular metal-silica composite aerogel particles of the present invention will be described in detail for each step.

Step 1)

Step 1) according to an embodiment of the present invention is for adding a silica precursor of acicular metal-silica composite aerogel particles, wherein a water glass solution is added to an acidic solution.

According to an embodiment of the present invention, sulfuric acid ($H_2SO_4$) may particularly be used as the acidic solution, and, in the present invention, a 60% sulfuric acid aqueous solution may specifically be used.

In an embodiment of the present invention, a silicon-containing alkoxide-based compound, such as tetramethyl orthosilicate (TMOS), tetraethyl orthosilicate (TEOS), or methyl triethyl orthosilicate, may be used as the silica precursor, but, in the present invention, water glass may specifically be used.

The water glass of the present invention represents a dilute solution in which distilled water is added to water glass and mixed, wherein the water glass denotes an aqueous solution of sodium silicate ($Na_2SiO_3$), as an alkali silicate salt obtained by melting silica (silicon dioxide, $SiO_2$) and alkali.

Since pH of the added water glass solution is excessively low due to the acidic solution, a gelation reaction does not occur, but the gelation reaction may occur by a basic catalyst subsequently added, and thus, a silica gel may be uniformly bonded or coated on surfaces of acicular metal particles to form acicular metal-silica composite aerogel particles.

Step 2)

Step 2) according to an embodiment of the present invention is for forming acicular metal particles, as an acicular intermediate, wherein, after adding the water glass solution to the acidic solution, a solution including a metal salt is added to perform an ion exchange reaction and a crystalline precipitation reaction through a supersaturation step due to an increase in reaction temperature.

Specifically, solubility of $CaSO_4$, which is formed by reacting with the solution ($CaCl_2$) including a metal salt due to strong ion exchange capacity of the sulfuric acid ($H_2SO_4$) of step 1), decreases with increasing reaction temperature, and accordingly, a crystal nucleus, as the acicular intermediate, is formed.

With regard to methods of adding the solution including a metal salt, in a case in which a large amount of the solution including a metal salt is added at once, since a concentration of $SO_4^{2-}$ ions of the sulfuric acid is rapidly reduced to adversely affect the formation of the acicular intermediate, it is desirable to add the solution including a metal salt in a dropwise manner.

In order to maximize a desired effect of the present invention, as an additive for a polymer resin, by using morphological advantages of the acicular metal-silica composite aerogel particles of the present invention, there is a need to appropriately adjust concentrations of the acidic solution, water glass solution, and solution including a metal salt which are reactants. The reason for this is that, in a case in which the metal-silica composite aerogel particles are prepared by using the reactants having appropriate concentrations, acicular particles having a more favorable aspect ratio for the additive for a polymer resin may be formed.

Thus, the concentrations of the acidic solution and the solution including a metal salt of the present invention may be in a range of 1.0 M to 3.0 M, and the concentration of the water glass solution may be in a range of 0.33 M to 1.0 M. Also, a concentration ratio of the acidic solution to the water glass solution may be 3:1, and a concentration ratio of the acidic solution to the solution including a metal salt may be 1:1.

In a case in which the concentrations of the acidic solution and the solution including a metal salt are excessively low of less than 1.0 M, a rate of supersaturation due to an increase in temperature may be reduced and growth of a crystal nucleus of the acicular intermediate may be difficult. Also, in a case in which the concentrations of the acidic solution and the solution including a metal salt are excessively high of greater than 3.0 M, as the concentrations are increased, selectivity to formation of several acicular intermediate particles is higher than growth into the acicular intermediate particles having a more favorable aspect ratio, and thus, acicular intermediate particles having a desired aspect ratio level may not be prepared.

Also, in a case in which the concentration of the water glass solution is excessively low of less than 0.33 M, a structure of a silica aerogel may not be properly formed on a surface of the acicular intermediate, and, since the aerogel may not withstand a shrinkage phenomenon that occurs during drying even though the aerogel are formed, the structure may collapse to significantly deteriorate physical properties. Furthermore, in a case in which the concentration of the water glass solution is excessively high of greater than 1.0 M, since the acicular metal-silica composite aerogel particles are agglomerated to each other due to an excessive gelation reaction, the morphological advantages of an acicular shape may not be utilized.

According to an embodiment of the present invention, the solution including a metal salt of the present invention may include a metal salt and a solvent, wherein distilled water or a polar solvent, such as ethanol, may be used as the solvent.

Also, calcium (Ca) may be used as the metal, and at least one metal salt selected from the group consisting of chloride, bromide, iodide, nitrate, nitrite, sulfate, acetate, sulfite, acetylacetonate, and hydroxide may be used as the metal salt, and, in the present invention, calcium chloride ($CaCl_2$) may specifically be used.

Step 3)

Step 3) according to an embodiment of the present invention is for preparing acicular metal-silica composite aerogel particles, wherein a basic catalyst is added to the acicular intermediate metal particles ($CaSO_4$) prepared in step 2).

In an embodiment of the present invention, the basic catalyst may play a role in promoting and completing the gelation reaction by increasing the pH of the water glass solution added to the reactor.

The induction of the gelation reaction of the water glass on the surface of the acicular intermediate as in the present invention is due to the following three reasons.

First, in a case in which an additive is acidic when acicular metal is actually used as the additive in a polymer resin, the additive may not be used because it affects physical properties of the polymer resin, and, in a case in which the basic catalyst is simply added to titrate to neutral, it may not be appropriate because it destroys an acicular morphology. Thus, in order to address these limitations, the additive is allowed to be basic by inducing the gelation of the water glass on the surface of the acicular metal.

Second, in order to reduce the breakage of additive particles due to constant shear during compounding, the gelation of the water glass on the surface is induced to improve strength of the acicular metal particles.

Third, with respect to simple acicular metal, advantageous effects of specific surface area may not be obtained, but, in a case in which the gelation reaction is induced on the surface, the advantageous effects of specific surface area may also be secured.

Thus, in the present invention, in order to prepare acicular metal-silica composite aerogel particles suitable for the additive for a polymer resin, the basic catalyst is added to the acicular intermediate metal particles to prepare acicular metal-silica composite aerogel particles to which the silica aerogel is uniformly bonded.

The bonding means physical bonding rather than chemical bonding, and the bonding means that the silica aerogel is present in the form of being adhered or coated on the surface of the acicular intermediate.

According to an embodiment of the present invention, in a case in which the water glass solution of the above concentration is used, the acicular metal-silica composite aerogel particles prepared by the method of the present invention may contain silica in an amount of 15 wt % to 25 wt % based on a total weight.

In a case in which the silica is included at an appropriate level as described above, it may be advantageous to increase mechanical strength and adjust density.

At least one selected from the group consisting of sodium hydroxide (NaOH), potassium hydroxide (KOH), calcium hydroxide ($Ca(OH)_2$), barium hydroxide ($Ba(OH)_2$), ammonium hydroxide ($NH_4OH$), sodium carbonate ($Na_2CO_3$), and magnesium hydroxide ($Mg(OH)_2$) may specifically be used as the basic catalyst of the present invention, and, for example, ammonium hydroxide may be used in the present invention.

The reason for this is that, since the pH is rapidly increased when a strong base is used, spherical silica gel particles are more likely to be formed rather than the formation of the silica gel on the surface of the acicular metal particles. Thus, in the present invention, since the rapid increase in the pH is suppressed by using ammonium hydroxide having a relatively low base dissociation constant (K), the silica gel may be allowed to be uniformly bonded or coated on the surface of the acicular metal particles.

The gelation may denote the formation of a network structure from the silica precursor material, and the network structure may denote a flat net-shaped structure, in which any specific polygons having one or more types of atomic arrangements are connected, or a structure in which a three-dimensional skeleton structure is formed by sharing vertices, edges, and faces of a specific polyhedron.

Also, with respect to the preparation method of the present invention, the precipitation reaction (or ion exchange reaction) to form the acicular intermediate particles of step 2) and the gelation reaction of step 3) of the present invention may prepare acicular metal-silica composite aerogel particles in a short period of time under low temperature and atmospheric pressure conditions, different from a conventional preparation method in which high-temperature and high-pressure conditions are required.

Specifically, the preparation method of the present invention may synthesize acicular metal-silica composite aerogel particles at a reaction temperature of 50° C. to 100° C., for example, 60° C. to 90° C., and at an atmospheric pressure, for example, a pressure of 1 bar to 1.2 bar within a short period of time of 1 hour to 5 hours, for example, 1 hour to 3 hours.

The expression "atmospheric pressure" denotes normal pressure or atmospheric pressure, wherein it denotes a pressure when separate high-pressure equipment, such as an autoclave, is not used or when the pressure is not particularly decreased or increased.

In a case in which the acidic solution, solution including a metal salt, and water glass solution of specific concentrations are used as in the preparation method of the present invention, since acicular particles having a specific aspect ratio that may maximize the morphological advantages may be more easily synthesized, total process time required to prepare acicular metal-silica composite aerogel particles may be significantly reduced even under mild conditions of low temperature and atmospheric pressure.

Specifically, in a case in which sulfuric acid is used as the acidic solution and calcium chloride is used as the solution including a metal salt, it is more advantageous for the rate of the ion exchange reaction forming the initial acicular intermediate than the use of other compounds. In the synthesis of the acicular particles as thermodynamically stable forms, dissociation rate of sulfuric acid and an amount of $SO_4^{2-}$ ions are absolutely important, wherein, if the amount of the $SO_4^{2-}$ ions is small or the ion exchange reaction rate is low, an intermediate rather than the acicular shape, such as $Ca(OH)_2$, is formed, and thus, it is difficult to synthesize uniform acicular particles. Also, productivity and economic efficiency of the method of preparing acicular metal-silica composite aerogel particles of the present invention may be increased by various variables, such as appropriate concentration ratios of the reactants, stirring speed, and reaction temperature, in addition to types of the above-described reactants.

Thus, with respect to the preparation method of the present invention, production costs may be reduced because separate high-temperature and high-pressure equipment, such as an autoclave, is not required, and productivity and economic efficiency are excellent because production is possible by a safer as well as simpler process. In addition, when used as the additive for a polymer resin, since dispersibility is increased by the uniformly coated silica aerogel, a separate surface modifier is not required, and thus, the production costs may be reduced.

In a case in which the reaction temperature of the preparation method of the present invention is less than 50° C., the acicular particles may not be properly synthesized or reaction time may be longer than a desired time due to an excessively low synthesis rate, and, in a case in which the reaction temperature is greater than 100° C., since the process is complicated and costs are increased, it may not meet the object of the present invention, i.e., preparation of acicular metal-silica composite aerogel particles having excellent productivity and economic efficiency.

Also, in a case in which the reaction is performed at a reaction pressure lower than atmospheric pressure, the acicular particles may not be properly synthesized or the reaction time may be longer than the desired time due to the excessively low synthesis rate, and, in a case in which the reaction is performed at a higher pressure, since expensive high-pressure equipment is required and the process is complicated, manufacturing costs are increased, production efficiency may be reduced, and the use of the dangerous high-pressure equipment may be problematic in terms of safety.

As described above, since the method of preparing acicular metal-silica composite aerogel particles according to the present invention may maximize the morphological advantages of the acicular shape by adjusting the aspect ratio of the acicular shape through the adjustment of the concentrations of the acidic solution, solution including a metal salt, and water glass solution which are reactants, metal-silica composite aerogel particles may be prepared in a short period of time under low temperature and atmospheric pressure conditions. Thus, since the process is simple and the production costs are reduced in comparison to a conventional preparation method, the productivity and economic efficiency may be improved.

The aspect ratio of the acicular metal-silica composite aerogel particles, in which the morphological advantages of the acicular shape may be maximized by adjusting the concentrations of the reactants, may be in a range of 1:5 to 1:25, for example, 1:20 to 1:25.

In the present invention, the expression "aspect ratio" denotes a ratio of particle diameter to particle length, wherein the aspect ratio, as the most basic physical property value for a non-spherical additive, affects mechanical properties, viscosity, and processability of a polymer resin when the non-spherical additive is added to the polymer resin.

In a case in which the aspect ratio is less than 1:20, dimensional stability and thixotropy may not be good. Also, in a case in which the aspect ratio is greater than 1:25, the breakage due to the shear during compounding may more frequently occur.

Since the acicular metal-silica composite aerogel particles prepared by the method of the present invention have the excellent aspect ratio, excellent viscosity characteristics and thixotropy may be obtained when used as the additive for a polymer resin.

Specifically, the acicular metal-silica composite aerogel particles of the present invention may have a thixotropic index (TI) of 5 to 7.

The expression "thixotropy" is a property in which there is no fluidity in a stationary state, but fluidity occurs when subjected to vibration, wherein the fluidity is a very important property of polymer products. A shear thinning phenomenon occurs in most polymer solutions, in which viscosity is constant when shear rate is low, but the viscosity decreases with increasing shear rate. A thixotropic effect, in which the viscosity is reduced when the shear rate is increased by adding the acicular metal-silica composite aerogel particles to the polymer solution, the viscosity is again increased when the shear rate is decreased, and the viscosity is significantly increased when the flow stops, may be expected.

The thixotropic index in the present invention denotes a value obtained by dividing viscosity at a low stirring speed by viscosity at a high stirring speed, wherein, in the present invention, the thixotropic index is specifically defined as (viscosity measured at a rotational speed of 0.5 rpm)/(viscosity measured at a rotational speed of 5 rpm) when using a Brookfield viscometer at room temperature.

In a case in which the thixotropic index is outside the range of 5 to 7, since the viscosity adjustment is not easy, there may be a limitation in processability.

Also, in order to strengthen the structure of the aerogel in the present invention, a step of aging to complete the chemical change by adding a basic catalyst and being left standing at an appropriate temperature after the completion of the gelation reaction may be further performed.

In a case in which the aging is performed, since the network structure of the silica gel is more strengthened by inducing Si—O—Si bonding in the aerogel as much as possible with the basic catalyst, mechanical stability of the acicular metal-silica composite aerogel particles may be further strengthened. In this case, the pore structure may be more easily maintained in a subsequent drying process.

Furthermore, the aging may be performed in an appropriate temperature range for optimum strengthening of the pore structure.

The aging of the present invention may be performed by being left standing at a temperature of 30° C. to 70° C. In a case in which the aging temperature is less than 30° C., since aging time is excessively increased to increase the total process time, the productivity may be reduced, and, in a case in which the aging temperature is greater than 70° C., since the loss of the solvent by evaporation is increased, raw material costs may be increased.

Also, the preparation method of the present invention may further include steps of washing, performing solvent substitution, and drying after the step 3).

The washing of the present invention is for preparing high-purity acicular metal-silica composite aerogel particles by removing impurities generated during the reaction, wherein the washing may be performed by adding a washing solvent to the acicular metal-silica composite aerogel particles and diluting and stirring for 20 minutes to 1 hour, and distilled water or alcohol may be used as the washing solvent.

Furthermore, in addition to the aging, the present invention may include a step of performing solvent substitution before the drying to prevent shrinkage or collapse of the pore structure in the drying process.

The silica wet gel prepared by using the water glass is in the form in which pores are filled with water as a solvent, wherein, if the solvent is simply removed by drying, shrinkage and cracking of the pore structure may easily occur due to a difference in solvent extraction rates and a capillary force caused by high surface tension of the water at a gas/liquid interface while the liquid-phase solvent is evaporated into a gas phase, and, as a result, a decrease in surface area and a change in the pore structure occur. Thus, in order to maintain the pore structure of the wet gel, there is a need to substitute the water having high surface tension with an organic solvent having relatively low surface tension. Therefore, in the present invention, the step of performing solvent substitution with a polar organic solvent, such as ethanol, methanol, or isopropanol, before the drying may be further performed.

Also, the drying of the present invention is a step for forming acicular metal-silica composite aerogel particles by removing the solvent from the acicular metal-silica composite wet gel, wherein the drying may be performed by atmospheric pressure drying at a temperature of 100° C. to 190° C. for 1 hour to 4 hours. Since the atmospheric pressure drying does not require high-pressure reaction conditions and special high-pressure equipment for supercritical drying, the process is simple and it is economically efficient.

Furthermore, the present invention provides acicular metal-silica composite aerogel particles having an aspect ratio of 1:20 to 1:25 and a thixotropic index of 5 to 7 which are prepared by the method of the present invention, and provides an additive for a polymer resin which includes the acicular metal-silica composite aerogel particles.

The aspect ratio and the thixotropic index are as described above, and, in a case in which the acicular metal-silica composite aerogel particles of the present invention are used as an additive in a polymer resin such as polyethylene, polypropylene, or an epoxy, since the shape, strength and density, and specific surface area characteristics of the particles are excellent, the viscosity characteristics and thixotropy of the polymer resin may be improved.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

A 0.33 M water glass solution was slowly added dropwise to a 1.0 M sulfuric acid aqueous solution in a reactor, and a 1.0 M calcium chloride solution ($CaCl_2 \cdot 2H_2O$) was then slowly added dropwise thereto to perform a precipitation reaction. The occurrence of white precipitates within a few tens of seconds was confirmed, pH in the reactor was controlled to be in a range of 7 to 8 by slowly adding an ammonia aqueous solution dropwise, and thus, a gelation reaction was induced on the surface of the acicular intermediate to prepare an acicular metal-silica composite wet gel. The precipitation reaction and the gelation reaction were performed at 90° C. and 1 bar for 2 hours.

Thereafter, washing with distilled water was repeated 3 to 5 times to remove impurities, solvent substitution was performed with ethanol, and atmospheric pressure drying was then performed at a temperature of 150° C. for 2 hours to finally prepare an acicular metal-silica composite aerogel.

Examples 2 to 5

Acicular metal-silica composite aerogel particles were prepared in the same manner as in Example 1 except that the conditions in Example 1 were changed as listed in the following Table 1.

Comparative Example 1

A 0.33 M water glass solution was slowly added dropwise to a reactor, and a 1.0 M calcium chloride solution ($CaCl_2 \cdot 2H_2O$) was then slowly added dropwise thereto to perform a precipitation reaction. The occurrence of white precipitates within a few tens of seconds was confirmed, pH in the reactor was controlled to be in a range of 7 to 8 by slowly adding an ammonia aqueous solution dropwise, and thus, a gelation reaction was induced to prepare an acicular metal-silica composite wet gel. The precipitation reaction and the gelation reaction were performed at 25° C. and 1 bar for 2 hours.

Thereafter, washing with distilled water was repeated 3 to 5 times to remove impurities, solvent substitution was performed with ethanol, and atmospheric pressure drying was then performed at a temperature of 150° C. for 2 hours to finally prepare a spherical metal-silica composite aerogel.

Comparative Examples 2 to 5

Acicular metal-silica composite aerogel particles were prepared in the same manner as in Example 1 except that the conditions in Example 1 were changed as listed in the following Table 1.

Experimental Example 1: Optical Microscopy and Scanning Electron Microscopy (SEM)

Optical microscope and scanning electron microscope (SEM) images of the acicular metal-silica composite aerogel particles prepared in Example 1 and Comparative Examples 2 to 5 were taken (×100, scale bar: 50.0 μm, FIGS. 2 to 7).

Figure 2:
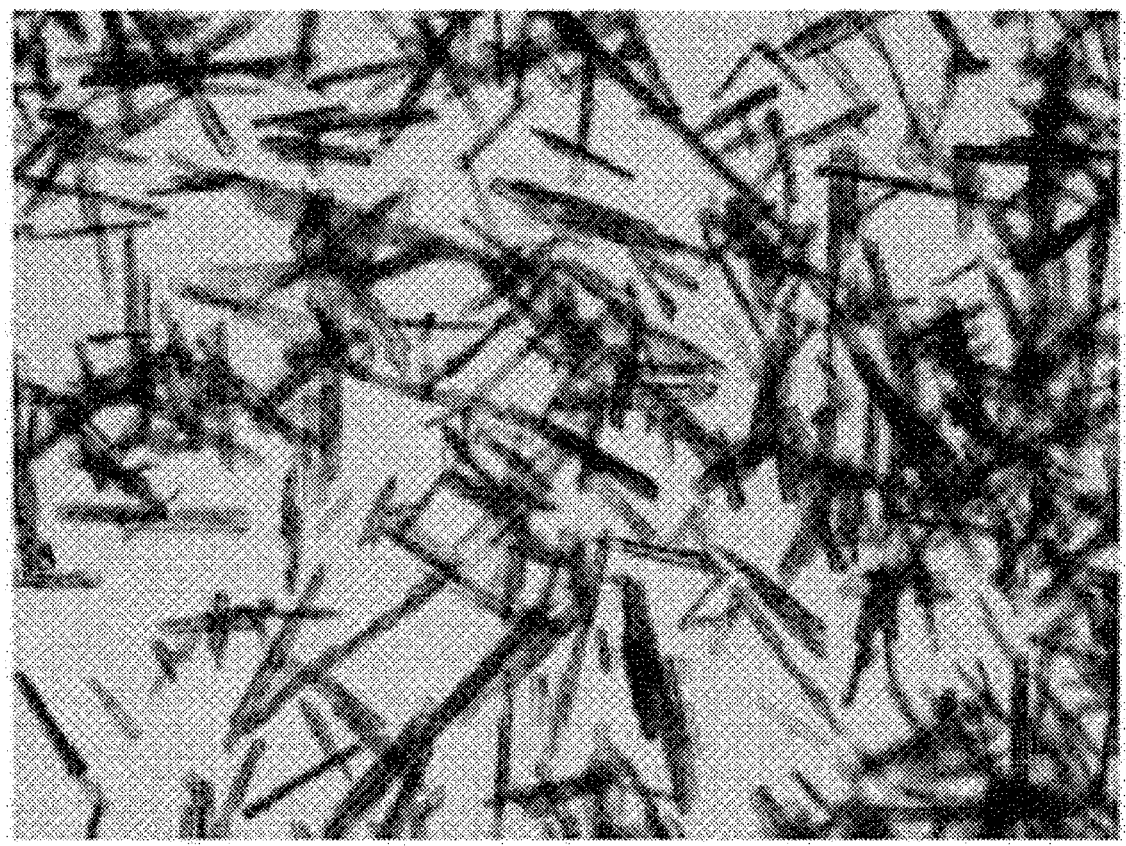
FIG. 2 is an optical microscope image of acicular metal-silica composite aerogel particles prepared in Example 1 of the present invention.
Figure 3:
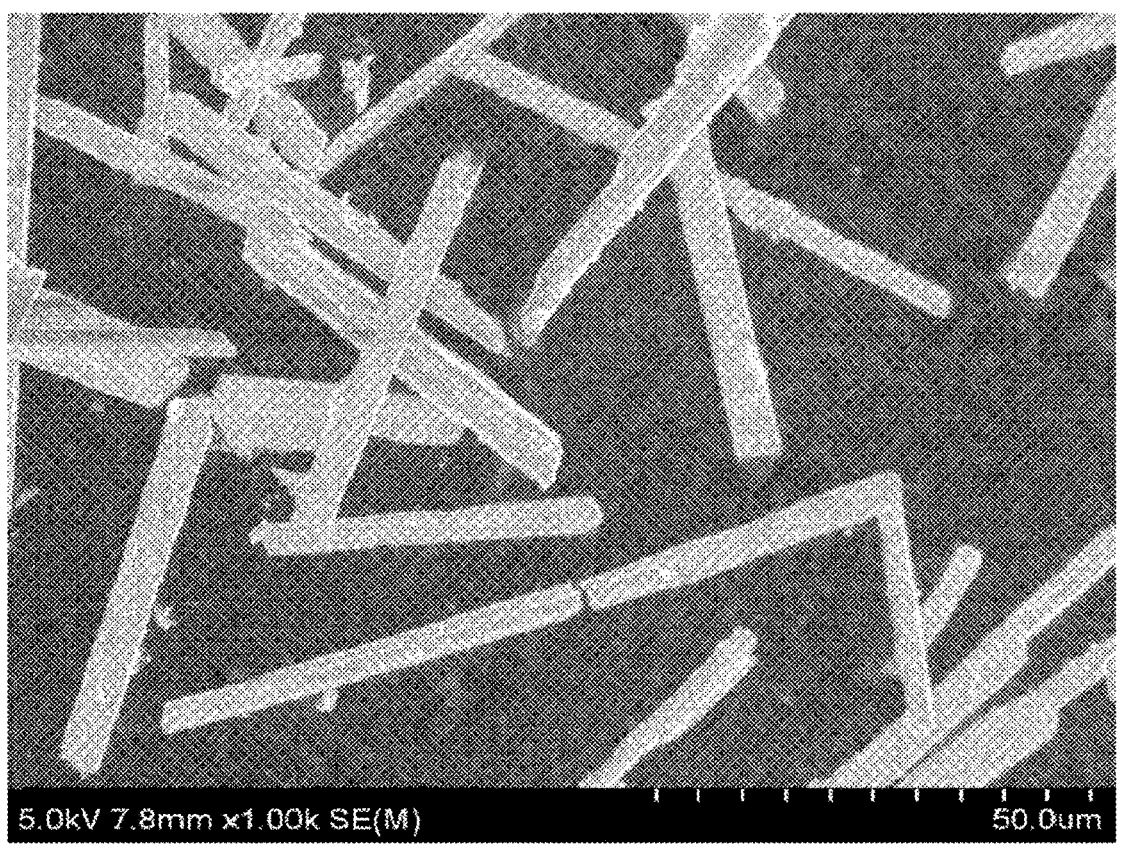
FIG. 3 is a scanning electron microscope (SEM) image of the acicular metal-silica composite aerogel particles prepared in Example 1 of the present invention.
Figure 4:
FIG. 4 is an SEM image of acicular metal-silica composite aerogel particles prepared in Comparative Example 2 of the present invention.
Figure 5:
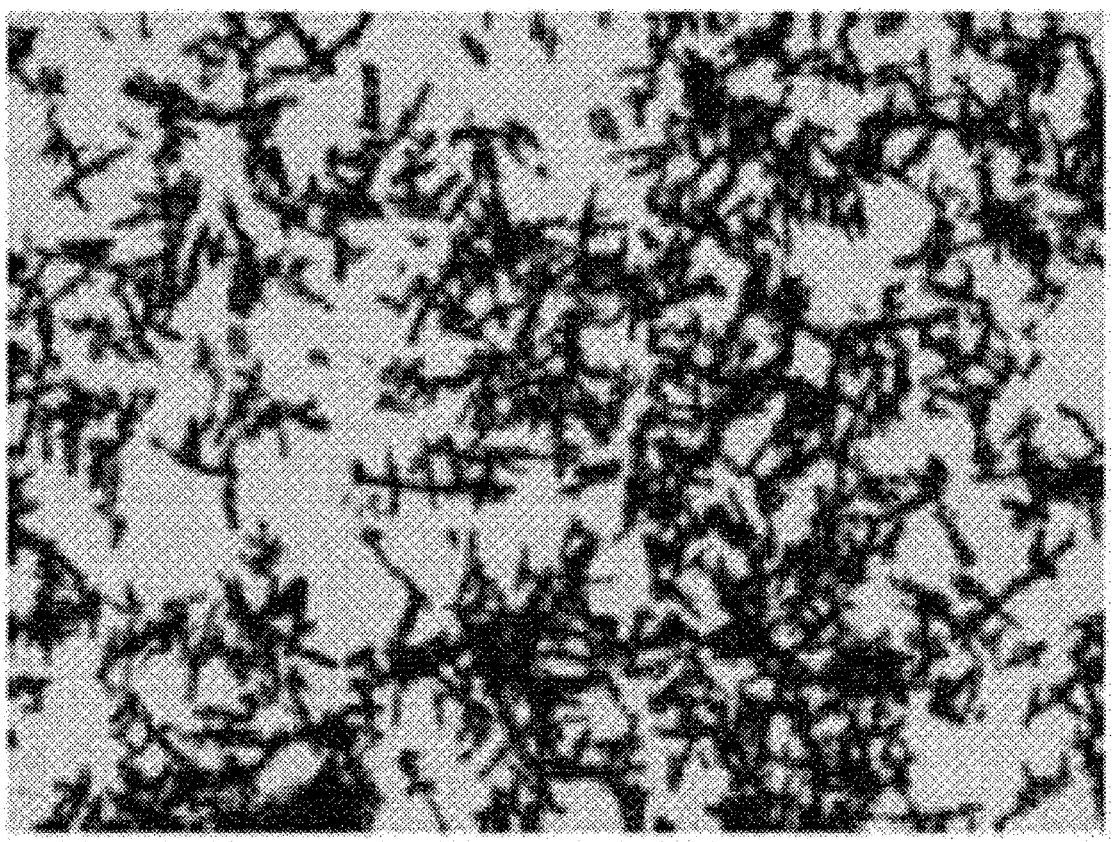
FIG. 5 is an SEM image of acicular metal-silica composite aerogel particles prepared in Comparative Example 3 of the present invention.
Figure 6:
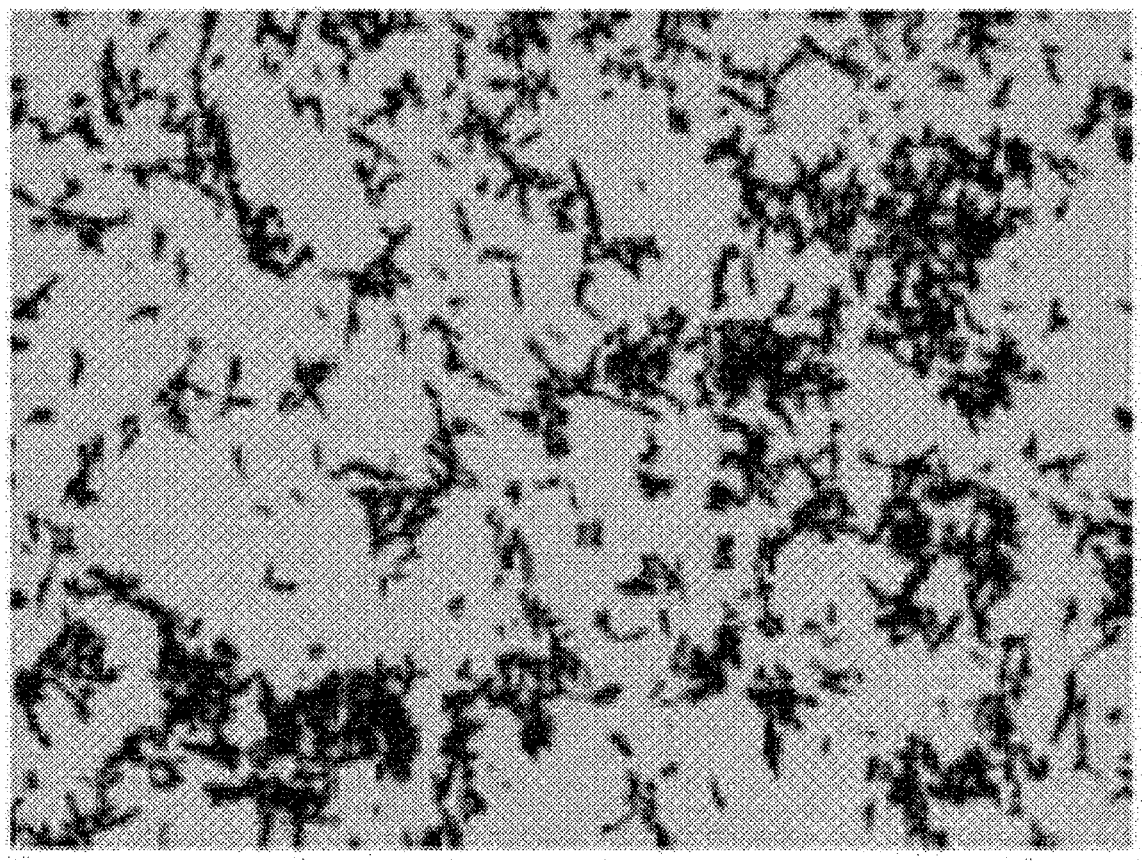
FIG. 6 is an SEM image of acicular metal-silica composite aerogel particles prepared in Comparative Example 4 of the present invention.
Figure 7:
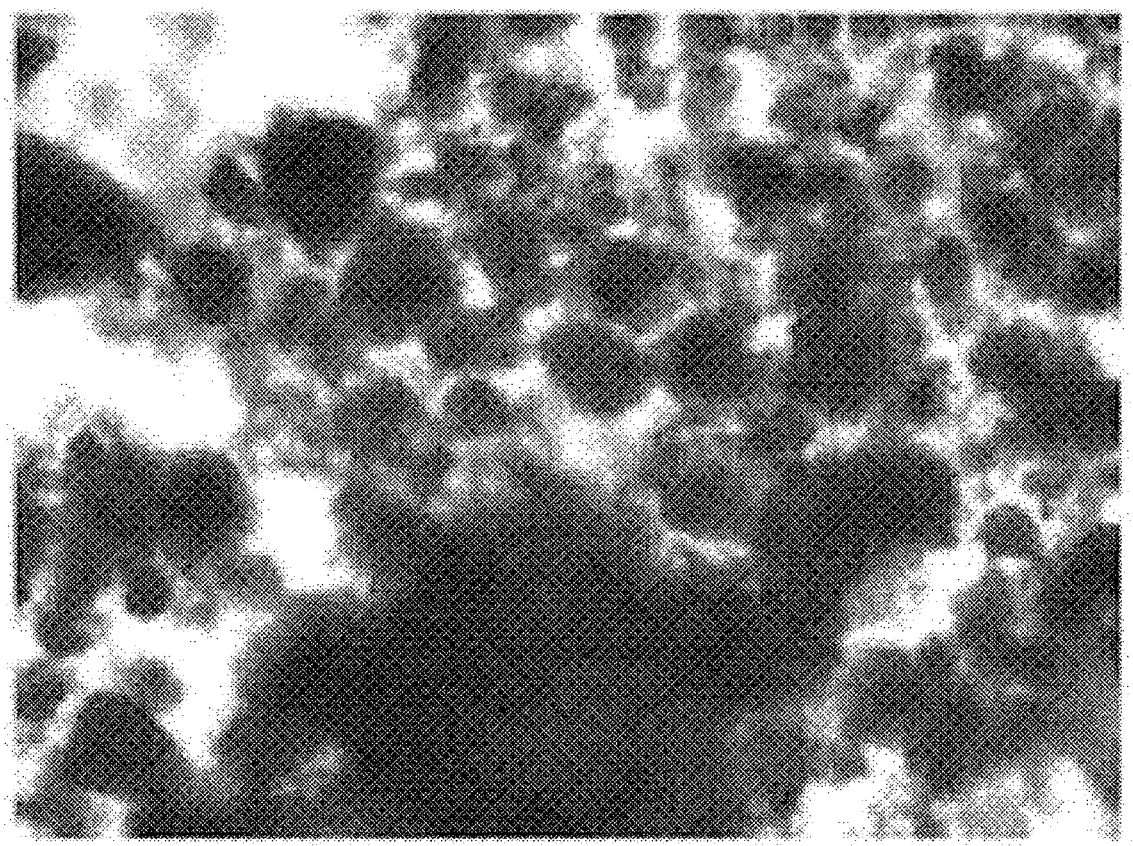
FIG. 7 is an SEM image of acicular metal-silica composite aerogel particles prepared in Comparative Example 5 of the present invention.

As illustrated in FIGS. 2 and 3, it may be confirmed that the metal-silica composite aerogel particles prepared by the preparation method in Example 1 of the present invention had an acicular shape having an aspect ratio of 1:20 to 1:25.

In contrast, in a case in which concentrations of the reactants were lower than those of the present invention as in Comparative Example 2, an aspect ratio was 1:10, wherein it may be confirmed that acicular particles having a desired aspect ratio may not be prepared.

Also, in a case in which the concentrations of the reactants were higher than those of the present invention as in Comparative Examples 3 to 5, since selectivity to formation of particles was higher than growth into acicular particles, the number of the particles prepared was increased, but it may be confirmed that it was difficult to prepare acicular particles having a desired aspect ratio. Particularly, in a case in which the concentrations of the reactants were excessively high as in Comparative Example 5, since agglomeration of the particles was increased, it may be confirmed that stirring was difficult.

Experimental Example 2: Aspect Ratio Measurement

Aspect ratios of the acicular metal-silica composite aerogel particles prepared in Example 1 and Comparative Examples 2 to 5 were measured, average values thereof were calculated, and the results thereof are presented in Table 1 below.

Experimental Example 3: Viscosity Measurement 50 g of a plasticizer (dioctyl phthalate (DOP)) and 1 g of a 2 wt % aqueous solution of each of the metal-silica composite aerogel particles prepared in Examples 1 to 5 and Comparative Examples 1 to 5 were each mixed with 50 g of a PVC resin, and each mixture was sufficiently filled in a beaker having a diameter of 4 cm or more such that a height of the mixture was 8 cm or more. Thereafter, the mixture was sufficiently mixed with a stirrer at about 1,000 rpm (varied with polymer resins) for about 10 minutes, and a degassing process was then performed to reduce the error caused by the air. Thereafter, viscosity values were measured at rotational speeds of 5 rpm and 0.5 rpm using a Brookfield viscometer (DV3T (LV), LV2 Spindle) at room temperature, and the results thereof are presented in Table 1 below.

Experimental Example 4: Thixotropic Index Measurement

Thixotropic indices were calculated by using the viscosities measured from the metal-silica composite aerogel particles prepared in Examples 1 to 5 and Comparative Examples 1 to 5, and each thixotropic index was specifically calculated by (viscosity value measured at a rotational speed of 0.5 rpm)/(viscosity value measured at a rotational speed of 5 rpm) in which the viscosity values were obtained from the above viscosity measurements.

Experimental Example 5: True Density Measurement

Inert gas (Ar, $N_2$) was introduced into the metal-silica composite aerogel particles prepared in Examples 1 to 5 and Comparative Examples 1 to 5 to measure porosity of the particle itself and internal volume, and true densities were measured therefrom.

TABLE 1

| | Concentrations of reactants | | | | Viscosity (cp) | | Thixotropic index | True density |
| | Acidic solution (M) | Water glass solution (M) | Solution including metal salt (M) | Aspect ratio | 5 rpm | 0.5 rpm | (TI) | (g/cm³) |
|---|---|---|---|---|---|---|---|---|
| Example 1 | 1.0 | 0.33 | 1.0 | 1:23 | 133,300 | 788,000 | 5.91 | 2.75 |
| Example 2 | 1.5 | 0.5 | 1.5 | 1:22 | 144,800 | 855,000 | 5.90 | 2.81 |
| Example 3 | 2.0 | 0.66 | 2.0 | 1:22 | 121,500 | 815,000 | 6.71 | 2.93 |
| Example 4 | 2.5 | 0.81 | 2.5 | 1:20 | 101,300 | 601,500 | 5.93 | 2.91 |
| Example 5 | 3.0 | 1.0 | 3.0 | 1:20 | 99,900 | 585,200 | 5.86 | 2.88 |
| Comparative Example 1 | — | 0.33 | 1.0 | — | 36,100 | 130,010 | 3.60 | |
| Comparative Example 2 | 0.75 | 0.25 | 0.75 | 1:10 | 36,100 | 150,010 | 4.16 | 2.64 |
| Comparative Example 3 | 4.0 | 1.33 | 4.0 | 1:8 | 41,000 | 150,500 | 3.67 | 2.81 |
| Comparative Example 4 | 4.5 | 1.5 | 4.0 | 1:7 | 39,040 | 141,300 | 3.62 | 2.77 |
| Comparative Example 5 | 5.0 | 1.67 | 5.0 | 1:5 | 38,500 | 136,300 | 3.54 | 2.90 |

As illustrated in Table 1 and FIGS. 2 and 3, with respect to Examples 1 to 5 of the present invention, since the concentrations of the reactants were adjusted to a specific range, it may be understood that acicular metal-silica composite aerogel particles having a high aspect ratio may be prepared. Also, in a case in which the acicular metal-silica composite aerogel particles having a high aspect ratio were added as an additive to the polymer resin, it may be confirmed that thixotropic indices were excellent.

In contrast, with respect to Comparative Example 1 in which, different from the preparation method of the present invention, a sulfuric acid aqueous solution was not used, it may be understood that the metal-silica composite aerogel particles did not have an acicular shape.

Also, in a case in which the concentrations of the reactants were outside the range of the present invention even if the preparation method of the present invention was used as in Comparative Examples 2 to 5, it may be understood that, since the acicular metal-silica composite aerogel particles having a low aspect ratio were prepared as illustrated in Table 1 and FIGS. 4 to 7, thixotropic indices were inferior to those of the examples when the acicular metal-silica composite aerogel particles were respectively added as an additive to the polymer resin.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Accordingly, it is to be understood that the present invention has been described by way of illustration and not limitation.

The invention claimed is:

1. A method of preparing acicular metal-silica composite aerogel particles, the method comprising:
   (1) adding an acidic solution and a water glass solution to a reactor;
   (2) forming an acicular intermediate by a precipitation reaction by adding a solution including a metal salt to the reactor after the addition of the water glass solution;
   (3) adding a basic catalyst to the reactor including the acicular intermediate to increase pH and perform a gelation reaction; and
   (4) washing, performing solvent substitution, and drying after (3),
   wherein:
   a concentration of the acidic solution is in a range of 1.0 M to 3.0 M;
   a concentration of the metal salt is in a range of 1.0 to 3.0 M; and
   a concentration of the water glass solution is in a range of 0.33 M to 1.0 M.

2. The method of claim 1, wherein:
   a ratio of the concentration of the acidic solution to the concentration of the water glass solution is 3:1, and
   a ratio of the concentration of the acidic solution to the concentration of the metal salt solution is 1:1.

3. The method of claim 1, wherein the acicular metal-silica composite aerogel particles have an aspect ratio of 1:20 to 1:25.

4. The method of claim 1, wherein the acicular metal-silica composite aerogel particles have a thixotropic index of 5 to 7.

5. The method of claim 1, wherein a silica aerogel is bonded to a surface of the acicular intermediate in the acicular metal-silica composite aerogel particles.

6. The method of claim 1, wherein the precipitation reaction and the gelation reaction are performed at a temperature of 50° C. to 100° C.

7. The method of claim 1, wherein the precipitation reaction and the gelation reaction are performed at a pressure of 1 bar to 1.2 bar.

8. The method of claim 1, wherein the precipitation reaction and the gelation reaction are independently performed for 1 hour to 5 hours.

9. The method of claim 1, wherein the acidic solution is sulfuric acid ($H_2SO_4$).

10. The method of claim 1, wherein the metal salt comprises calcium (Ca).

11. The method of claim 1, wherein the metal salt comprises at least one ion selected from the group consisting of chloride, bromide, iodide, nitrate, nitrite, sulfate, acetate, sulfite, acetylacetonate, and hydroxide.

12. The method of claim 1, wherein the basic catalyst comprises at least one hydroxide selected from the group consisting of sodium hydroxide (NaOH), potassium hydroxide (KOH), calcium hydroxide ($Ca(OH)_2$), barium hydroxide ($Ba(OH)_2$), ammonium hydroxide ($NH_4OH$), sodium carbonate ($Na_2CO_3$), and magnesium hydroxide ($Mg(OH)_2$).

13. The method of claim 1, wherein the basic catalyst is added in an amount such that the pH is increased to be in a range of 7 to 9.

14. The method of claim 1, wherein the solvent substitution is performed with a polar organic solvent.

15. The method of claim 14, wherein the polar organic solvent includes ethanol, methanol, or isopropanol.

16. The method of claim 15, wherein the polar organic solvent includes ethanol.

* * * * *